July 22, 1958  A. E. GIBSON, JR  2,844,249
PACKAGED COMMODITY
Filed Aug. 17, 1954

INVENTOR.
ALBERT E. GIBSON, JR.
BY
ATTORNEY

United States Patent Office 2,844,249
Patented July 22, 1958

2,844,249
PACKAGED COMMODITY

Albert E. Gibson, Jr., York, Pa., assignor to The Dentists' Supply Company of New York, a corporation of New York Application August 17, 1954, Serial No. 450,359

7 Claims. (Cl. 206—84)

This invention relates to a packaged commodity and a process of forming the same. More particularly, but without restriction thereto, the commodity included in the package is of a heat-sensitive nature and susceptible of being changed in nature or physical characteristics when subjected, for example, to a temperature of a predetermined limit or amount. The method used in packaging the commodity is particularly suitable for hermetically enclosing the commodity, and in the preferred embodiment of the invention, the sealing of the package which encloses the commodity is accomplished by means of heat. For example, the package is initially open at one end for purposes of introducing the commodity into the package and said open end then is sealed hermetically, preferably by fusion produced by heat.

There are numerous substances, particularly of a chemical nature, which are quite sensitive to any substantial increase in temperature above room temperature for example, due to the same having a low boiling or a low melting point. Due to this characteristic, when it is desired to hermetically seal such substances within a container, closing or sealing of the container by fusion can not be utilized due to the fact that the heat used in closing the container by fusion will disadvantageously affect the commodity such as a chemical substance within the container.

One specific type of material which is especially sensitive to a substantial increase in temperature is a resin or mixture of resins, particularly in monomeric or partially monomeric state so that the same is either only partially cured or totally uncured. Under such circumstances, where it is desired to maintain such resin in either totally or partially uncured or unpolymerized condition, a retarding agent which prevents polymerization below a predetermined temperature is added to the resin. Especially if the resin is of the so-called air-curing type, it is necessary to preserve the same in hermetically sealed condition. A glass container such as a vial is highly suitable for the purpose of preserving such a resinous commodity in the desired, incompletely cured condition but, if the open end of the container is sealed by fusing or melting the same, the temperature to which the container must be raised is such that the temperature within the container will be raised to a degree at which the effect of the retarding agent will be destroyed and the resinous commodity then will begin to polymerize and will continue to do so while the commodity is being stored in the container. This is especially possible where no excessive length of a glass container is desired over that required to actually store the commodity. It is to be understood that the foregoing description is intended to be only exemplary and not restrictive. Certain highly volatile and readily decomposable substances in the chemical and pharmaceutical fields particularly also are within a similar category with the specifically described resins set forth above.

The principal object of the present invention is to provide a packaged commodity which may be sealed hermetically through the use of fusion by heat without deleteriously affecting particularly a heat-sensitive commodity contained in the package during the sealing operation. This may be achieved by a process including the use of several possible means, either singly or in combination. One of the means includes the use of a heat reflecting surface which is disposed within the container within which the commodity is sealed, the reflecting surface being directed toward the initially open end of the package which is fused shut so that the heat of fusion will be reflected away from the commodity in the package.

Another means which may be used either solely or in conjunction with such reflecting surface comprises a preferably cellular structure which produces heat insulation sufficient to prevent the heat of fusion from deleteriously affecting the commodity within the container.

Another object of the invention is to provide a commodity which is hermetically sealed within an inexpensive container and the means utilized for preventing the heat of fusion used in closing the container from affecting the commodity likewise is inexpensive and easily incorporated within the container.

Details of the invention are set forth in the following specification and illustrated in the accompanying drawing comprising a part thereof.

In the present exemplary illustration of the invention, a vial-like container 10 is shown which is sealed at one end 12 and at the opposite or filling end 14 initially is open. In this exemplary illustration, it is assumed for purposes of ready illustration that the container is formed from glass. However, this is not intended to be restrictive upon the invention since the container 10 may be formed from any other suitable, preferably fusible material for purposes of easily and inexpensively hermetically sealing an exemplary commodity 16 therewithin. For example, the container 10 may be of suitable resinous material which may be fused to hermetically seal a commodity within the container, especially if the commodity does not react with the material from which the container 10 is formed. It is well recognized that glass is quite universally useful as a container because of its relatively inert nature.

Figure 1:
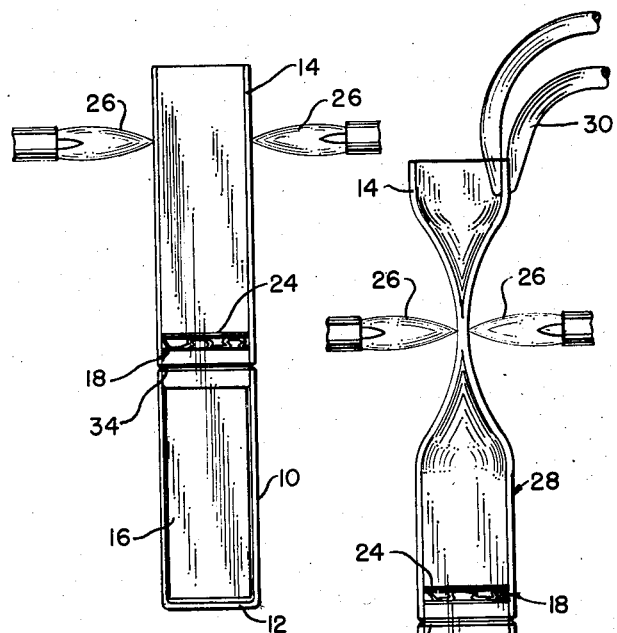
Fig. 1 is a side elevation of an exemplary container as it appears prior to being sealed hermetically.
Figure 2:
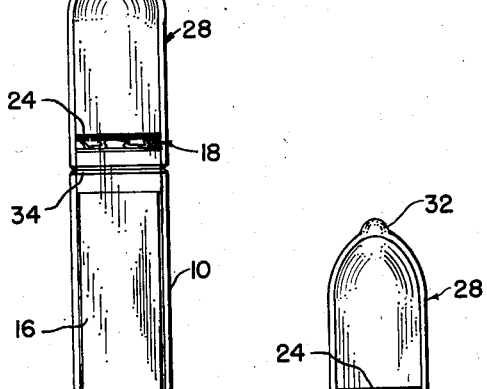
Fig. 2 is a view similar to Fig. 1 but showing the container in the process of being sealed.
Figure 3:
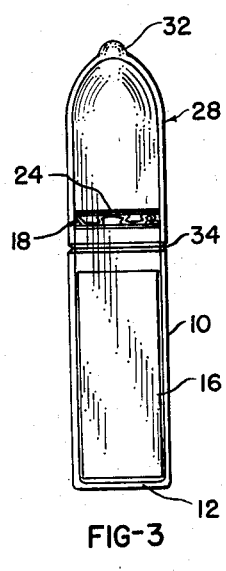
Fig. 3 is a view similar to Figs. 1 and 2 but showing the container hermetically sealed so as to comprise a packaged commodity.
Figure 4:
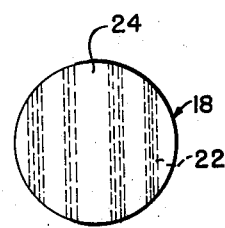
Fig. 4 is a top plan view of an exemplary heat barrier included within the container illustrated in Figs. 1 through 3.
Figure 5:
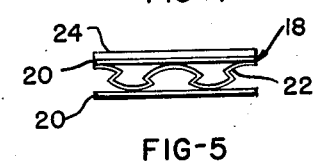
Fig. 5 is a side elevation of the heat barrier shown in Fig. 4.

In accordance with the principles of the preferred embodiment of the invention, after the commodity 16 has been placed within the container 10, particularly while the container is held in a substantially vertical condition as illustrated in Figs. 1 through 3, heat barrier means 18 are introduced into the container 10 and preferably is spaced from the commodity 16. In the specific illustration of the barrier 18 shown on the drawing, the same comprises a disc stamped from corrugated paper board, whereby the means 18 is cellular and has excellent heat insulating properties. Structurally, the barrier 18 comprises a pair of discs 20 which, in effect, constitute diaphragms spaced apart by the intermediate corrugated paper member 22. Thus, the barrier 18 is unitary and may easily be handled.

The diameter of the barrier 18 preferably is very slightly larger than the inner diameter of the container 10, whereby the perimeter of the barrier 18 frictionally engages the inner walls of the container 10 and thus readily maintains the barrier 18 in any desired position of adjustment within the container. This arrangement insures maximum efficiency in regard to heat insulation.

The protection afforded the commodity 16 by the barrier 18 greatly is enhanced by the inclusion therewith of a heat reflecting surface comprising a layer of aluminum foil 24 which is positioned on the surface of the barrier 18 opposite the commodity 16 within the container 10. The shiny, reflective quality of aluminum foil is highly efficient to enhance the insulating properties of the barrier 18 and thus further protect the commodity 16 against the effect of heat used to fuse the container 10 closed in hermetically sealed condition. Preferably, the sheet of corrugated board from which the barrier 18 is punched may have a sheet of aluminum foil adhesively secured to one surface thereof prior to the barriers 18 being stamped from the sheet in quantity.

After the barrier 18 has been placed in the container 10 as described and is illustrated in Figs. 1 through 3, the upper end of the container 10 is subjected to heat applied, for example, by a pair of oppositely directed gas flames 26. The container 10 may be rotated while the upper portion thereof is being heated by the gas flames 26 in order that a symmetrical conical configuration will be imparted to the hermetically sealed commodity generally indicated 28 in Figs. 2 and 3. After the container 10 has been heated a short while at its upper end by the gas flames 26, the upper open end of the container 10 may be engaged by any suitable means such as a pair of tongs 30 so that said upper end may be pulled away from the lower portion of the container and effect a constricted and closed sealed upper end 32 on the commodity 28 as clearly shown in Fig. 3.

During such sealing operation, it may readily be visualized that the interior of the upper portion of the container 10 particularly will have its temperature elevated considerably; yet due to the reflecting nature of the aluminum 24 and the insulating properties of the barrier 18, the interior of the portion of the container 10 within which the commodity 16 is positioned will be affected only slightly and not sufficiently to deleteriously affect the heat-sensitive commodity 16 therein.

Although the present illustrations have shown only a single heat barrier 18 with the reflecting means 24 thereon, it is within the purview of the invention that more than one of such barriers may be used if the requirements of the commodity 16 dictate the same in order to localize any imparted heat of fusion to the upper end of the container. Also, while the barrier 18 has been shown in conjunction with the heat reflecting member 24 on one surface thereof, it is to be understood that the invention is not to be restricted to the use of both of these elements in conjunction with each other since, under some circumstances, the barrier 18 is adequate without using a reflecting member 24 and under the same or other circumstances, depending upon the nature of the commodity 16, a heat reflecting member 24 alone may be adequate. If the heat reflecting member 24 is used solely, it will be understood that the same preferably will be sufficiently stiff to engage the inner walls of the container 10 by friction, for example, and thereby be supported within the container in any desired position.

Under circumstances where the container 10 may be formed from resinous material, for example, the gas flames 26 may not be suitable to effect a hermetic sealing of the open end of the container and heated crimping or pressing members could be used for sealing the container to produce a hermetically sealed and packaged commodity rather than the gas flames 26.

In the foregoing description, no specific mention is made of the nature or characteristics of the commodity 16 other than to state that it is heat-sensitive. Said commodity is representative of a number of different compounds and items in the category of being heat-sensitive. As described in the introduction of this specification, the invention is highly applicable to the production of a packaged commodity comprising either a totally or partially polymerized resinous product which, for example, is incompletely cured and a coiled sheet thereof may be maintained in soft, pliable condition and also contain various percentages of monomer. A product of this nature must be maintained in hermetically sealed condition until ready for use and final curing.

To facilitate the rupturing of the sealed commodity 28, the container 10 may have a groove 34 ground or otherwise formed, for example, in the outer surface of the container 10. By filing said groove slightly at one or more spots around its circumference, the opposite ends of the container 10 may be readily separated at said groove in order to render the commodity 16 therein accessible. The groove 34 is of course only exemplary and any other suitable means may be used to facilitate the opening of the sealed commodity 28.

It also is to be understood that the exemplary illustration of the heat barrier 18 shown in the drawing and described hereinabove merely is exemplary and is not restrictive inasmuch as other forms and types of barrier may be used, cellular or otherwise. By way of further example, felt may be suitable under certain circumstances, depending upon the nature of the commodity 16 and the characteristics of its heat-sensitive nature. Also, while friction is a convenient means for retaining the barrier 18 within the container 10, it is conceivable that other means might be used where, for example, the nature of the barrier 18 may dictate and a suitable adhesive may be used which is not reactive with the composition of the commodity 16.

In the foregoing description, the reflecting means has been described as comprising a sheet of aluminum foil 24. This specific description is intended to be illustrative only and not restrictive. Other suitable reflecting means may be used such as other foils or sheet material, or surfaces applied by spraying or otherwise such as lacquer or paint having therein material possessing reflecting properties when dried capable of reflecting heat or other rays used incident to packaging the commodity. It also is contemplated that the reflecting layer or means 24, and/or the insulating barrier 18 preferably are such as to prevent or at least substantially minimize the passage of rays of any kind used incident to the sealing or packaging process from passing into the portion of the container 10 within which the commodity 16 is held.

It will be seen from the foregoing that the present invention provides a hermetically sealed and packaged commodity which is relatively inexpensive as compared with many more complicated closures which now must be used to maintain various substances in hermetically sealed condition. Particularly where heat is required to effect hermetic sealing of the container for the commodity by fusion which necessarily includes the use of heat, the present invention is most effective and efficient to prevent the contents of the container from being affected by the heat of fusion and particularly in regard to commodities which are sensitive to an appreciable rise in temperature over the normal stable temperature thereof. The process for producing the packaged commodities constituting the present invention is simple and inexpensive and highly adapted to produce packaged commodities which are uniform in nature and appearance.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:
1. A packaged commodity comprising in combina- tion, a container closed at one end and initially open at the other end, said container being formed from fusible material, a commodity within said container, and a heat barrier formed from heat insulating material and positioned transversely within said container and engaging the inner walls thereof between the open end of said container and said commodity, the open end of the container being sealed hermetically by fusion after the commodity and heat barrier are positioned within said container and said heat barrier having a heat reflecting surface positioned to reflect heat from the fusion sealing away from the commodity within said container.

2. The combination of a heat-sensitive commodity hermetically sealed by heat within a container having an initially open end through which the commodity is introduced and including a heat insulation barrier positioned within said container and extending transversely thereacross between the commodity and said initially open end of said container and operable to prevent the temperature within the portion of the container within which the commodity is disposed from increasing to any substantial degree while said container is being sealed by heat, said heat barrier having a heat reflecting surface positioned toward the initially open end of said container to reflect heat used to seal the container away from said commodity.

3. The combination set forth in claim 2 further characterized by said heat barrier comprising a heat insulating plug frictionally fitted within said container transversely thereof and having heat reflecting means on the surface thereof nearest the initially open end of said container.

4. A package commodity comprising in combination, a container closed at one end and initially open at the other end, said container being formed from fusible material, a commodity within said container, and a heat barrier positioned within said container and extending transversely between the walls thereof and between the open end thereof and said commodity, said barrier having a heat reflecting surface positioned to reflect heat toward said open end thereof away from said commodity and the open end of said container being sealed hermetically by fusion after said commodity and barrier means are positioned therein.

5. A method of hermetically sealing a heat-sensitive commodity within a container open at one end and sealed at the other comprising the steps of placing said commodity within said container, and hermetically sealing the open end of said container by means of heat to fuse portions of the walls of said container together while minimizing the transfer of heat to said commodity within said container by reflecting said heat from the commodity within said container.

6. The method set forth in claim 5 further characterized by said minimizing of heat transfer being accomplished by insulation within said container in addition to reflection.

7. A packaged commodity comprising in combination, a container closed at one end and initially open at the other end, said container being formed from fusible material, a commodity within said container, and a heat barrier formed from cellular heat insulating material and positioned transversely within said container and frictionally engaging the walls thereof between the open end thereof and said commodity, the open end of the container being sealed hermetically by fusion after the commodity and barrier means are positioned within said container and said barrier having a heat reflecting surface positioned thereon to reflect heat away from the commodity within said container.

References Cited in the file of this patent

UNITED STATES PATENTS

| | | |
|---|---|---|
| 716,223 | Hall | Dec. 16, 1902 |
| 1,093,570 | Bennett | Apr. 14, 1914 |
| 1,613,152 | Agar | Jan. 4, 1927 |
| 2,277,288 | Berch | Mar. 24, 1942 |
| 2,292,295 | Royal | Aug. 4, 1942 |
| 2,373,340 | Rohdin | Apr. 10, 1945 |
| 2,430,995 | Roos | Nov. 18, 1947 |
| 2,480,376 | Martin | Aug. 30, 1949 |
| 2,494,915 | Van Der Poel | Jan. 17, 1950 |
| 2,700,461 | Smith | Jan. 25, 1955 |

FOREIGN PATENTS

| | | |
|---|---|---|
| 134,107 | Australia | Sept. 5, 1949 |